(12) United States Patent
Kachline

(10) Patent No.: US 10,286,477 B2
(45) Date of Patent: *May 14, 2019

(54) INCREASED DURABILITY WELDING TORCH ASSEMBLY AND COMPONENTS

(71) Applicant: Lincoln Global, Inc., City of Industry, CA (US)

(72) Inventor: Jeffrey L. Kachline, Highland Heights, OH (US)

(73) Assignee: LINCOLN GLOBAL, INC., City of Industry, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/412,455

(22) Filed: Jan. 23, 2017

(65) Prior Publication Data

US 2017/0129037 A1   May 11, 2017

Related U.S. Application Data

(63) Continuation of application No. 14/589,226, filed on Jan. 5, 2015.

(Continued)

(51) Int. Cl.
*B23K 9/29*   (2006.01)
*B23K 9/28*   (2006.01)

(52) U.S. Cl.
CPC .............. *B23K 9/295* (2013.01); *B23K 9/287* (2013.01); *B23K 9/291* (2013.01); *B23K 9/296* (2013.01)

(58) Field of Classification Search
CPC ........ B23K 9/296; B23K 9/295; B23K 9/173; B23K 9/32; B23K 9/26; B23K 9/123; B23K 9/282; B23K 9/285; B23K 9/323; B23K 11/314; B23K 26/211; B23K 9/124; B23K 9/1336; B23K 9/122; B23K 9/28; B23K 9/291; B23K 11/256; B23K 11/3018;

(Continued)

(56) References Cited

U.S. PATENT DOCUMENTS 5,683,599 A  *  11/1997  Ellis .................. H05H 1/26
                                                   219/121.36
6,307,179 B1    10/2001  Walters
(Continued)

FOREIGN PATENT DOCUMENTS

CN    101925433 A    12/2010
ES      1071271 Y     2/2010
(Continued)

OTHER PUBLICATIONS thefabricator.com/article/tubepipefabrication/brazing-copper-tubing; Sperko, Walter; thefaricator; May 15, 2003.*

(Continued)

*Primary Examiner* — Ibrahime A Abraham
*Assistant Examiner* — Joseph M Baillargeon

(57) ABSTRACT

A welding gun assembly having a connection between a diffuser and the inner gun tube which provides increased strength between the diffuser and the gun tube to prevent inadvertent damage to the welding torch and upstream components. The diffuser comprises an engagement portion which engages with, and overlaps, at least a part of a sturdier portion of the inner gun tube. This engagement provides a stronger and more stable connection between the gun tube and the diffuser.

20 Claims, 5 Drawing Sheets

Related U.S. Application Data

(60) Provisional application No. 61/924,532, filed on Jan. 7, 2014.

(58) Field of Classification Search
CPC ..... B23K 11/317; B23K 11/36; B23K 11/362; B23K 2201/006; B23K 26/0096; B23K 26/032; B23K 26/082; B23K 26/142; B23K 26/1476; B23K 26/22; B23K 26/24; B23K 26/705; B23K 37/003
USPC ............ 219/137.42, 137.31, 137.61, 137.44, 219/137.63, 74, 121.63, 125.1, 221
See application file for complete search history.

(56) References Cited

U.S. PATENT DOCUMENTS

| | | | |
|---|---|---|---|
| 6,347,814 B1 * | 2/2002 | Cerruti | F16L 15/002 285/332.4 |
| 6,852,950 B2 | 2/2005 | Giese | |
| 7,176,412 B2 | 2/2007 | Wells | |
| 7,342,200 B2 | 3/2008 | Eberle | |
| 7,663,074 B2 | 2/2010 | Wells | |
| 8,338,753 B2 | 12/2012 | Kachline | |
| 8,604,388 B2 | 12/2013 | Dingeldein | |
| 8,633,422 B2 | 1/2014 | Giese | |
| 9,216,471 B2 | 12/2015 | Hassan | |
| 9,364,915 B2 | 6/2016 | Meess | |
| 9,527,155 B2 | 12/2016 | Meess | |
| 2002/0113047 A1 | 8/2002 | Doherty | |
| 2005/0218131 A1 | 10/2005 | Wells | |
| 2005/0218132 A1 | 10/2005 | Wells | |
| 2007/0176419 A1 * | 8/2007 | Taillon | F16L 27/0812 285/275 |
| 2007/0210049 A1 | 9/2007 | Dingeldein | |
| 2008/0191466 A1 * | 8/2008 | Knipple | A61M 16/0816 285/31 |
| 2009/0173904 A1 * | 7/2009 | Roberts | F16K 43/006 251/340 |
| 2011/0006048 A1 * | 1/2011 | Ma | B23K 9/32 219/137.61 |
| 2011/0266259 A1 | 11/2011 | Kachline | |
| 2013/0126504 A1 | 5/2013 | Hassan | |
| 2013/0134143 A1 | 5/2013 | Hassan | |
| 2014/0263250 A1 | 9/2014 | Meess | |
| 2014/0263252 A1 | 9/2014 | Sasdowski | |
| 2014/0263253 A1 | 9/2014 | Meess | |
| 2016/0039036 A1 | 2/2016 | Meess | |
| 2016/0311050 A1 | 10/2016 | Cooper | |
| 2016/0039037 A1 | 11/2016 | Meess | |

FOREIGN PATENT DOCUMENTS

| | | |
|---|---|---|
| FR | 2044515 A5 | 2/1971 |
| FR | 2971723 A1 | 8/2012 |
| JP | 61177776 | 11/1986 |
| JP | 63104796 | 5/1988 |
| JP | 2012091211 A | 5/2012 |

OTHER PUBLICATIONS

"Gooseneck-Style Guns"—Miller Electric Mfg Co. (www.millerwelds.com/pdf/spec_sheets/M1-75.pdf) Mar. 2013—4 pages.
"Roughneck C-Series"—Miller Electric Mfg Co. (www.millerwelds.com/pdf/spec_sheets/AY17-0.pdf) Mar. 2004—4 pages.
"Trafimet Diffuser Bernard (4335)"—Aucklands Grainger (www.acklandsgrainger.com/AGIPortalWeb/WebSource/ProductDisplay/globalProductDetailDisplay.do?item_code=TFIME0110) accessed on May 1, 2014—1 page.
"Diffuser MIG Gun (man part # 404-32)"—William Adams (www.williamadamsshop.com.au/part/welding-and-gas/1605/diffuser-mig-gun) accessed on Dec. 19, 2016—2 pages.
"404-3 Gas Diffuser Retaining Head Tregaskiss Style 404-3 hd 2 pack"—Arndt Enterprise Ltd. (stores.ae-welding-industrial.com/404-3-gas-diffuser-retaining-head-tregaskiss-style-404-3-hd-2-pack/) accessed on Dec. 19, 2016—3 pages.
"Diffuser/Nozzle Holder, HD54-16, PK5"—W.W. Grainger, Inc. (www.grainger.com/product/AMERICAN-TORCH-TIP-Diffuser-Nozzle-Holder-45G308) accessed on Dec. 19, 2016—3 pages.
"Welding City 5-pk Gas Diffuser 4335 for Bernard MIG Welding Gun"—PicClick LLC (picclick.ca/WeldingCity-5-pk-Gas-Diffuser-4335-for-Bernard-MIG-190509912496.html) accessed on Dec. 19, 2016—5 pages.
"Hrmaxi 450 Compatible for Hrmaxi Welding Torch Gas Diffuser"—Focus Technology Co., Ltd (czhuarui.en.made-in-china.com/product/bSOnBIGUgDkf/China-Hrmaxi-450-Compatible-for-Hrmaxi-Welding-Torch-Gas-Diffuser.html) accessed on Dec. 19, 2016—4 pages.
"Gas Diffuser ME0109 (35-5) (224-228-000) Magnum 100L Gun Trafimet" Imgrum (www.imgrum.net/media/1274664933211418171_313480E3498) accessed on Dec. 19, 2016—2 pages.
"Bernard™ Quik Tip™ Consumables"—Bernard (www.bernardwelds.com/bernard-quik-tip-consumables-p151588#.WFNsNPl97IU) accessed on Dec. 19, 2016—3 pages.
"PSF160A Compatible for Hresab Welding Torch Gas Diffuser"—Focus Technology Co., Ltd (czhuarui.en.made-in-china.com/product/LKZQokaPhIWR/China-PSF160A-Compatible-for-Hresab-Welding-Torch-Gas-Diffuser.html) accessed on Dec. 19, 2016—4 pages.
".281/.312 Fastip Diffuser 1/8 in Recess"—Miller Manufacturing/Fresno Oxygen/Barns Welding Supply (www.barneswelding.com/products-view.mcic?s=3059) accessed on May 1, 2014—2 pages.
"Small Centerfire Diffuser Q-Series MIG Gun Consumable"—Bernard/Fresno Oxygen/Barns Welding Supply (www.barneswelding.com/products-view.mcic?s=3033)—accessed on May 1, 2014—2 pages.
International Search Report of PCT/IB2015/0000009 dated Jul. 21, 2016.

* cited by examiner

INCREASED DURABILITY WELDING TORCH ASSEMBLY AND COMPONENTS

PRIORITY

The present application is a continuation of and claims priority to U.S. patent application Ser. No. 14/589,226, filed on Jan. 5, 2015, which claims priority to U.S. Provisional Patent Application No. 61/924,532, filed on Jan. 7, 2014, both of which are incorporated herein by reference in their entirety.

TECHNICAL FIELD

Devices, systems, and methods consistent with the invention relate to welding, and more specifically to devices, systems and methods for providing an increased durability welding torch and welding torch components.

BACKGROUND

In typical GMAW and GTAW type welding operations a welding torch/gun is used to deliver the arc to the weld in both automatic, semi-automatic and manual welding operations. Often times the torch/gun is handled roughly or makes significant contact with the workpiece, which can severely damage the torch/gun such that it cannot effectively be used. For example, in manual and semi-automatic operations, users tend to use the torch like a hammer to chip off slag from the weld, while in automatic/robotic welding operations there can be instances where the torch impacts the workpiece, tooling, etc. These events can cause damage to the torch and torch components, and can be particularly damaging when the impact loads on the torch are lateral. These loads can tend to bend the torch—specifically at the gooseneck portion of the torch, which can adversely affect the wire feeding, and other operations of the torch.

Further limitations and disadvantages of conventional, traditional, and proposed approaches will become apparent to one of skill in the art, through comparison of such approaches with embodiments of the present invention as set forth in the remainder of the present application with reference to the drawings.

BRIEF SUMMARY OF THE INVENTION

An exemplary embodiment of the present invention is a welding gun assembly having a connection between a diffuser and the inner gun tube which provides increased strength between the diffuser and the gun tube to prevent inadvertent damage to the welding torch and upstream components. The diffuser comprises an engagement portion which engages with, and overlaps, at least a part of a sturdier portion of the inner gun tube. This engagement provides a stronger and more stable connection between the gun tube and the diffuser.

Another exemplary embodiment of the present invention is a welding torch assembly that includes an inner gun tube and a diffuser disposed downstream of the inner gun tube. The inner gun tube has a main body portion and a distal end portion disposed downstream of the main body portion. The distal end portion has a wall thickness smaller than that of the main body portion. The inner gun tube further includes a stepped portion that extends radially from the outer surface of the distal end portion to the outer surface of the main body portion. The diffuser includes a cavity disposed on its upstream side. In the cavity is disposed the distal end portion of the inner gun tube, which is coupled to the diffuser. The diffuser further includes a locking portion disposed on its upstream end. When the inner gun tube fully engages the diffuser, the stepped portion of the inner gun tube contacts the locking portion of the diffuser.

BRIEF DESCRIPTION OF THE DRAWINGS

The above and/or other aspects of the invention will be more apparent by describing in detail exemplary embodiments of the invention with reference to the accompanying drawings, in which.

DETAILED DESCRIPTION

Figure 1:
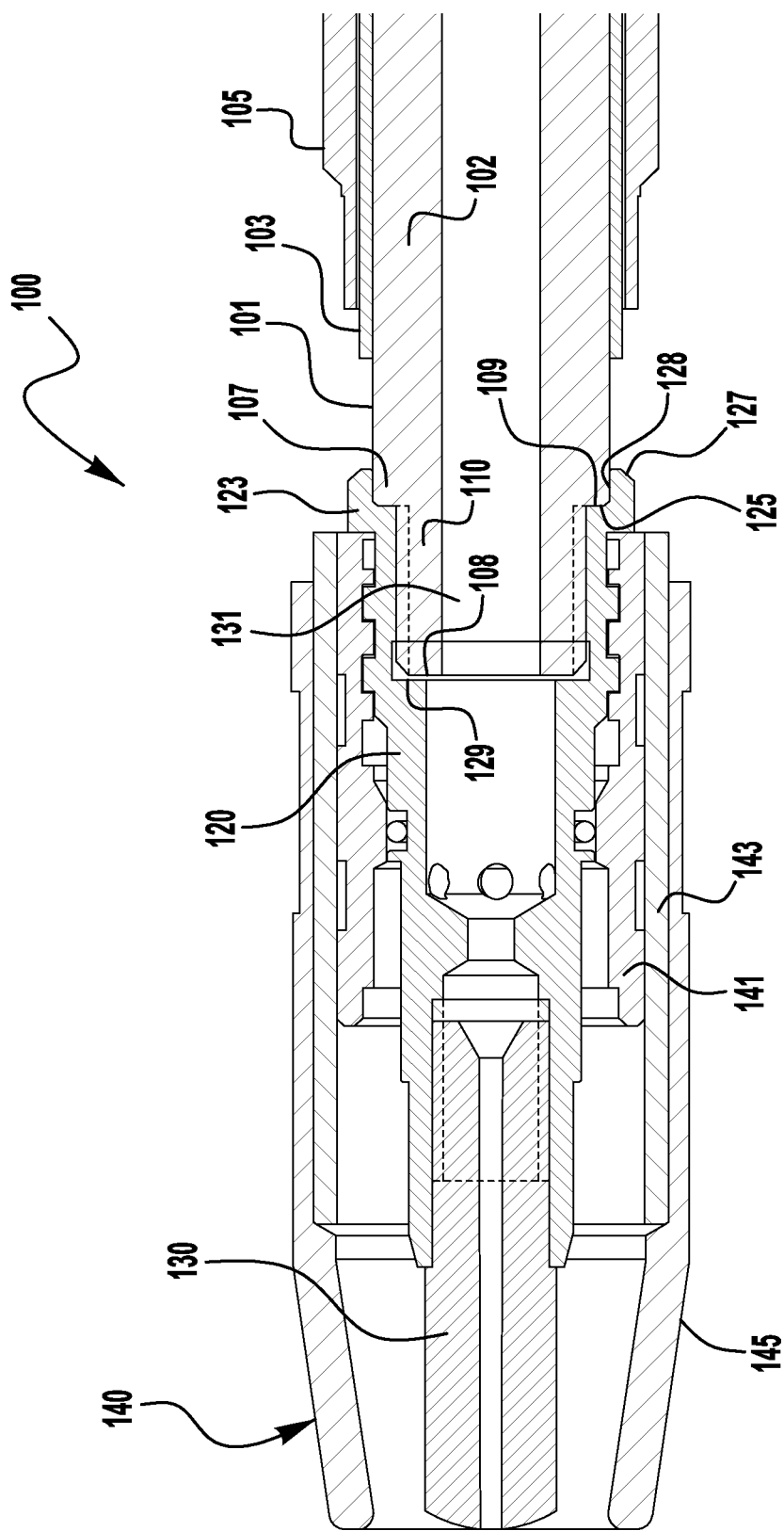
FIG. 1 illustrates an exemplary embodiment of a portion of a welding gun assembly of the present invention.

Exemplary embodiments of the invention will now be described below by reference to the attached Figures. The described exemplary embodiments are intended to assist the understanding of the invention, and are not intended to limit the scope of the invention in any way. Like reference numerals refer to like elements throughout.

It should be understood that throughout the present application the use of the terms welding torch and welding gun are intended to be interchangeable, as both terms are used by those of skill in the art to describe the torch/gun assembly.

As previously discussed, torches can be damaged by various events, especially events involving high load impacts. In robotic applications this can occur when the torch inadvertently is caused to impact the workpiece. These impacts are especially damaging when the torch has a goose-neck portion. A goose-neck portion is located upstream from the distal, working end of the torch and is typically a bend in the gun tube having an angle in the range of 20 to 60 degrees. It is at the area of the bend that many instances of damage occur. Specifically, because of the pre-existing bend in the torch this area is more susceptible to additional bending when loads are applied on the torch. When this bend area is further bent due to external loads it can severely impede the passing of a consumable through the gun tube. In some extreme instances the bend can be large enough to completely block the path of the consumable and even shielding gas. Additionally, in known torches, because of the existing construction of torches, the connection between the torch diffuser and the inner gun tube is such that a structural weak point exists in the structure or the inner gun tube which is also highly susceptible to damage. Embodiments of the present invention address these issue and create a torch with increased integrity and usability.

FIG. 1 depicts the working end portion of an exemplary torch assembly 100 of the present invention. For purposes of clarity the goose-neck portion of the gun tube is not shown in this figure. Furthermore, because the construction and operation of welding torches is generally known, the details of such construction and operation will not be discussed in detail herein. As shown, the torch assembly 100 is comprised of a number of components and is used to deliver both a consumable and a shielding gas to the workpiece for a welding operation. The torch assembly 100 comprises an inner gun tube 101 having a main body portion (or upstream portion) 102 and a distal end portion 110, where the main body portion 102 has a thicker wall thickness than the distal end portion 110, as shown. Covering the inner gun tube 101 is an insulator 103 and an outer gun tube sheath 105. Threaded onto the distal end 110 of the gun tube 101 is a diffuser 120 which aids in properly directing and distributing the shielding gas for a welding operation. Coupled to the downstream end of the diffuser 120 is a contact tip 130, which is typically used to pass the welding current into the consumable which is passing though the center of the contact tip 130 during welding. Threaded onto the outside of the diffuser 120 is a nozzle 140, where the nozzle 140 is comprised of an inner nozzle component 141 which threads onto the diffuser, as shown, an insulator portion 143 and an outer nozzle portion 145. The insulator portion 143 electrically isolates the outer nozzle portion 145 from the electrically live components within the torch assembly 100. The nozzle 140 is used to direct the shielding gas from the diffuser 120 to the distal end of the torch assembly 100 and the workpiece for welding.

Figure 2:
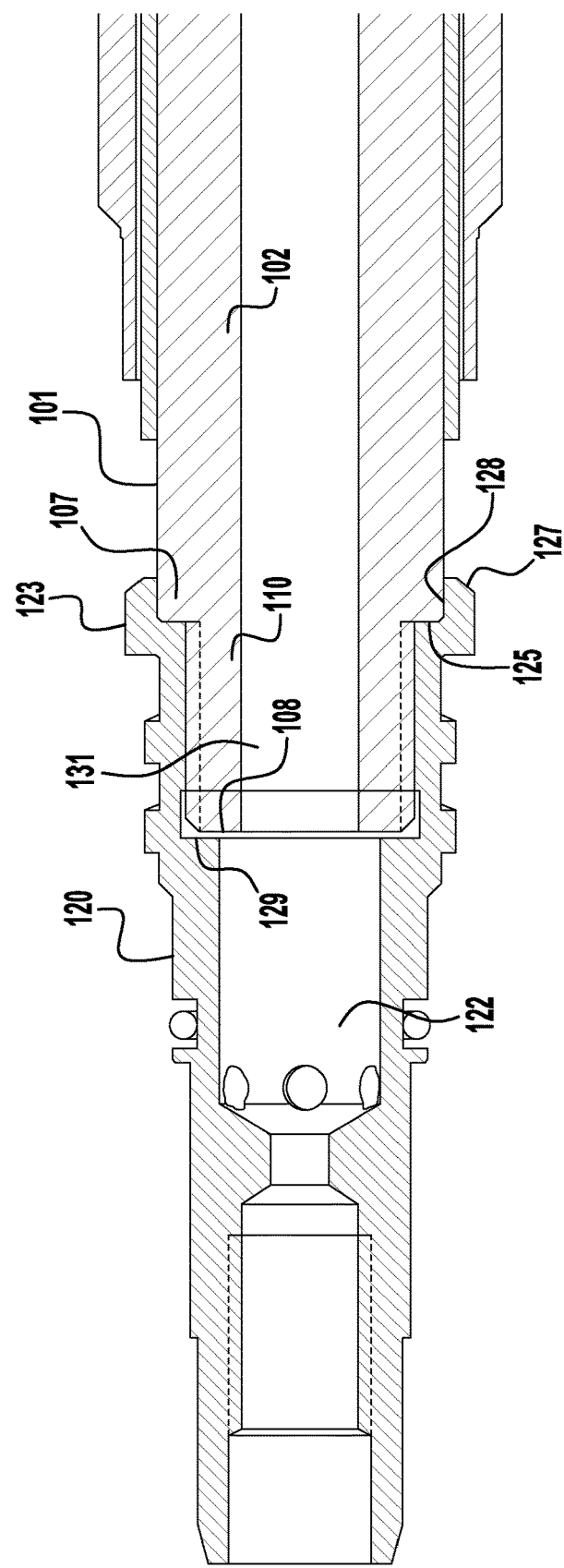
FIG. 2 illustrates a diffuser and an inner gun tube of the embodiment shown in FIG. 1.

As shown in FIG. 1, the structural connection between the inner gun tube 101 and the diffuser 120 is such that the connection has increased structural integrity. This connection is also shown in FIG. 2, omitting some of the components described above, for clarity. As shown, the distal end portion 110 of the inner gun tube 101 has a wall thickness which is less than that of the wall thickness of the upstream portion 102 (i.e. the main body portion) of the inner gun tube 101. The distal end portion 110 is inserted, and mechanically coupled (for example, using threads) into an end cavity 131 of the diffuser 120 with an upstream portion of the end cavity 131 having a larger inner diameter than a downstream portion of the end cavity 131 as shown in FIG. 1. The diffuser 120 also has a diffuser cavity 122 which is downstream of a shoulder portion 129, where the shoulder portion 129 separates the end cavity 131 of the diffuser 120 from the diffuser cavity 122. The inner gun tube 101 also has a distal end 108 which, when fully inserted into the end cavity 131 of the diffuser 120, creates a small gap between the distal end 108 and the shoulder portion 129. In exemplary embodiments, this gap is very small, but the distal end 108 does not make contact with the shoulder portion 129. Any contact between these surfaces can compromise the proper construction and integrity of the torch assembly 100. Also, as shown in each of FIGS. 1 and 2, the upstream end of the diffuser 120 comprises a locking portion (or stepped portion) 123 that extends radially outwardly from the outer surface of the diffuser 120. When fully assembled, the locking portion 123 engages and locks with the inner gun tube 101 in such a way as to engage with the upstream portion 102 of the gun tube 101. Specifically, the locking portion 123 engages with the inner, gun tube 101 at its thicker portion. This is discussed further below.

As shown in the exemplary embodiments of FIGS. 1 and 2, the transition between the upstream portion 102 and the distal end portion 110 of the gun tube 101 has a locking shoulder portion (or stepped portion) 107 which radially extends from the outer wall of the distal end portion 110 to the outer wall of the upstream portion 102 of the inner gun tube 101. When fully assembled, the locking portion 123 of the diffuser 120 engages with the locking shoulder portion 107 and the outer surface of the upstream portion 102. As can be seen in FIG. 2, the locking portion 123 of the diffuser 120 surrounds the locking shoulder portion 107 of the inner gun tube 101 from radially outward of the locking shoulder portion 107. Specifically, the locking portion 123 comprises a shoulder engaging portion 125, which contacts the locking shoulder portion 107 when the diffuser 120 is fully installed. Further, the locking portion 123 comprises an extension portion 127 which extends along a length of the outer surface of the upstream portion 102 of the inner gun tube 101 (or in a axial direction of the inner gun tube 101). The extension portion 127, which defines the upstream portion of the end cavity 131 having the larger inner diameter, comprises an interior surface 128 which engages with the outer surface of the upstream portion 102. In exemplary embodiments of the present invention, the engagement between the interior surface 128 and the outer surface of the upstream portion 102 is a friction fit type connection where at least some contact exists between the surfaces. If this connection is too loose then some of the structural integrity improvements of the present invention may not be fully realized. Further, in some exemplary embodiments, the transition between the interior surface 128 and the shoulder engaging portion 125 (i.e. inner corner portion of the stepped portion) is chamfered or radiused. This aids in reducing stress concentrations at this connection point.

In exemplary embodiments of the present invention, the radial height (or radial thickness) of the shoulder portion 107 is in the range of 10 to 20% of the outer diameter of the upper portion 102 of the inner gun tube 101 at the connection between the diffuser 120 and the inner gun tube 101. In other exemplary embodiments, the radial height is in the range of 10 to 15%. Such a radial height (distance between the outer surface of the distal end portion 110 and the outer surface of the upper portion 102) provides sufficient structural stability, while ensuring the structural integrity of the gun tube 101 remains. Further, in additional exemplary embodiments, the length of the interior surface 128 is at least as long, or longer than the radial height of the shoulder portion 107. That is, the length of the interior surface 128 of the locking portion 123 on the inner gun tube 101 is at least as long, or longer than the height difference between the distal end portion 110 and the upstream portion 102 of the tube 101. In exemplary embodiments of the present invention, the interior surface 128 is longer than the shoulder portion 107 by a distance in the range of 0 to 45% of the locking shoulder portion 107. In other exemplary embodiments of the present invention, the interior surface 128 is longer than the shoulder portion 107 by a distance in the range of 20 to 45% of the height of the locking shoulder portion 107. By having the interior surface 128 longer than the height of the locking shoulder portion 107, a significant increase in bending strength is achieved between the diffuser 120 and inner gun tube 101. However, if the length of the interior surface 128 becomes too long, it will be difficult to ensure the desired fit between the components to achieve the desired structural integrity.

Figure 3:
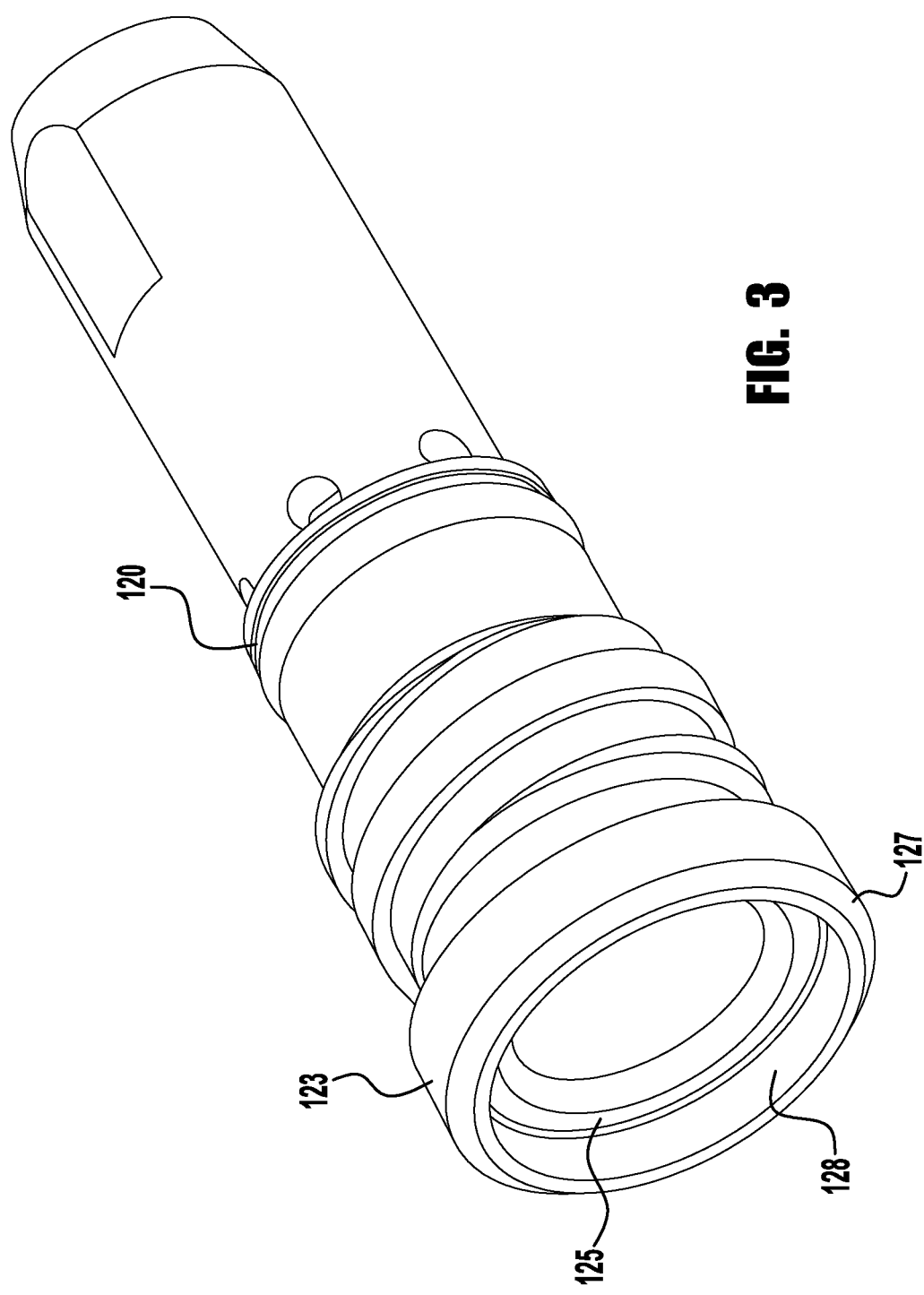
FIG. 3. Illustrates an asymmetric view of the diffuser of FIG. 1.

With the connection structure described above, any inadvertent loads or forces placed on the nozzle/diffuser are directed directly to the thicker portion (i.e. upstream portion) 102 of the inner gun tube 101. Such a connection structure has not been previously used in gun/torch construction. In some known connection methodologies, the diffuser is coupled only to a narrow portion of the inner gun tube. In such a connection structure, any loads on the nozzle/diffuser are directed to only a thinner portion of the gun tube, which can cause severe damage to the gun tube—sometimes necessitating replacement. With the connection structure described herein, a construction is achieved which significantly resists both sides loads and axial loads on the torch. In fact, torches constructed as described herein can sustain nearly double the impact loads than known torches without the need for significant thickness increases in the components. With the construction described herein, forces and impact loads are more easily directed into the upper portion of the inner gun tube 101, thus making the construction more stable. FIG. 3 depicts an asymmetric view of the diffuser 120 described above.

Figure 4:
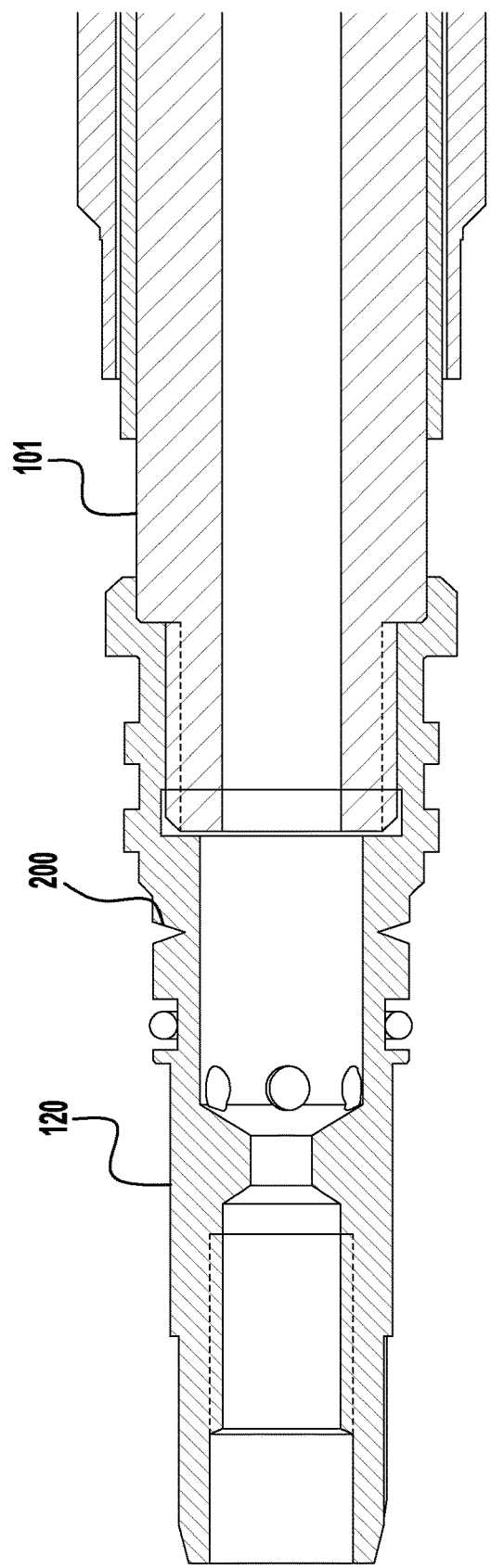
FIG. 4 illustrates another exemplary embodiment of a diffuser of the present invention.

Another exemplary embodiment of the present invention is shown in FIG. 4. In this embodiment, the diffuser 120 further includes a break-away recess 200 on an outer surface of the diffuser 120. As shown in FIG. 4, this recess 200 may be disposed downstream of the end cavity 131 of the diffuser 120. The break-away recess 200 provides a weak point in the diffuser 120 such that when a force or a load is applied to the distal end of the torch, the diffuser 120 fails at the break-away recess 200. While this will destroy the diffuser, it can save any components of the welding system upstream of the diffuser 120, and may save components at the end of the torch, such as the nozzle components. That is, the recess 200 is to be constructed such that when the torch assembly 100 experiences an impact load or force above a threshold, the downstream portion of the diffuser 120 (downstream of the recess 200) breaks away from the upstream portion of the diffuser 120 which remains coupled to the inner gun tube 101. Such a feature ensures that no upstream components, such as robot arms components or the goose-neck portion of the torch, etc. are damaged when an impact occurs. In exemplary embodiments, the shape and depth of the recess is to be determined such that the optimal break-away conditions are achieved. For example, in exemplary embodiments, the break-away recess 200 has a depth which is in the range of 35 to 65% of the wall thickness of the diffuser 120 at the point of the recess 200. Further, in exemplary embodiments, the recess 200 may have a pointed, or narrow bottom surface to the recess (i.e. v-shaped groove) 200. This is depicted in FIG. 4, which shows the recess 200 as triangular. Having such a shape aids in concentrating stresses at the recess portion 200 and ensures that the diffuser 120 fails at the desired location. Of course, the recess portion 200 can have other shapes so long as the desired break-away abilities are achieved.

Figure 5:
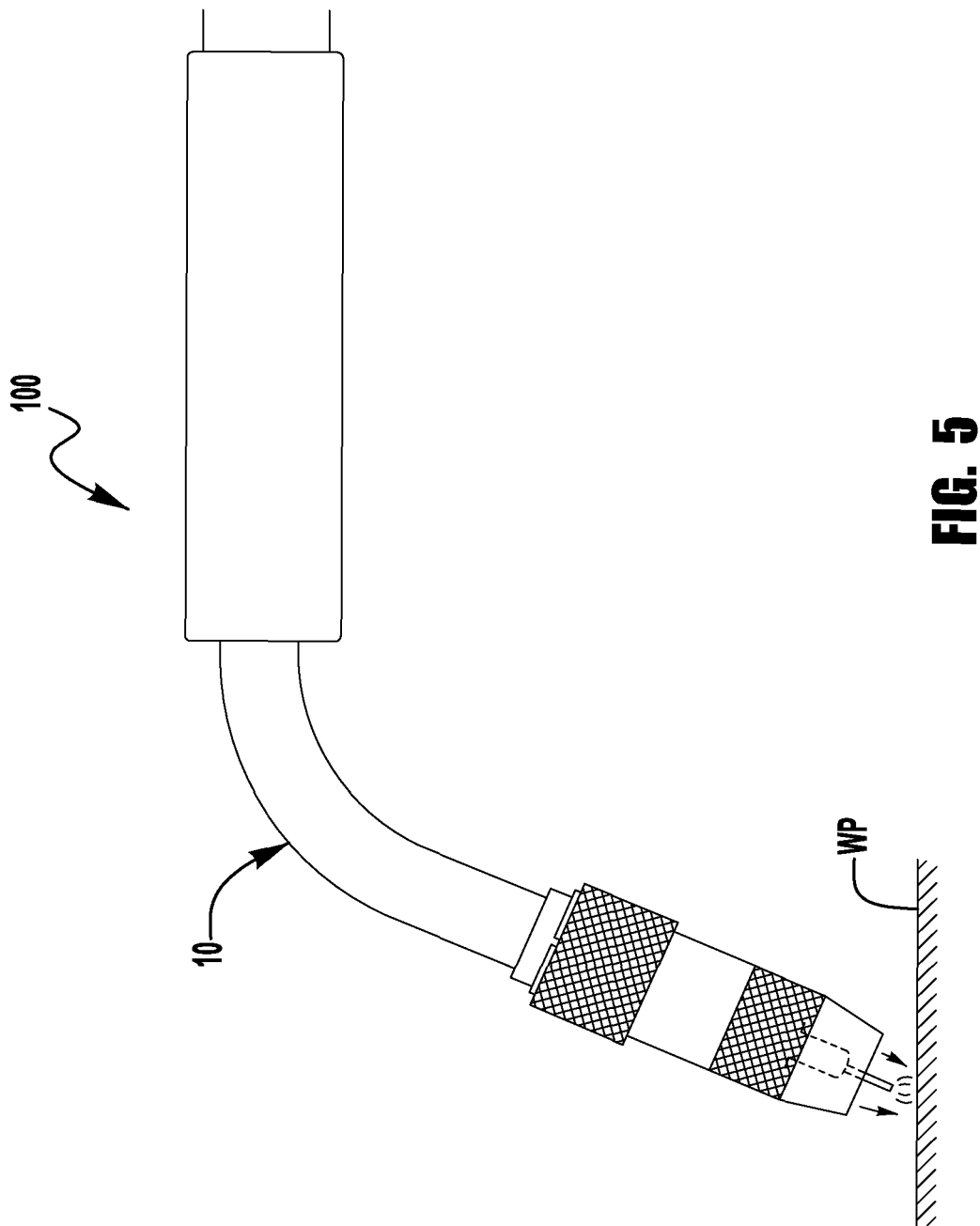
FIG. 5 illustrates another view of a torch assembly of the present invention.

FIG. 5 depicts a typical torch or gun assembly of the present invention with a goose-neck portion 10 shown.

While the claimed subject matter of the present application has been described with reference to certain embodiments, it will be understood by those skilled in the art that various changes may be made and equivalents may be substituted without departing from the scope of the claimed subject matter. In addition, many modifications may be made to adapt a particular situation or material to the teachings of the claimed subject matter without departing from its scope. Therefore, it is intended that the claimed subject matter not be limited to the particular embodiment disclosed, but that the claimed subject matter will include all embodiments falling within the scope of the appended claims.

What is claimed is:

1. A diffuser for a welding torch assembly, comprising:
a cavity disposed on an upstream side of the diffuser, the cavity having:
a first portion that is configured to accept therein a distal end portion of an inner gun tube, and
a second portion that is configured to accept therein a portion of a main body portion of the inner gun tube;
a stepped portion disposed on the upstream side of the diffuser, extending in a radially outwardly direction, from the first portion to the second portion; and
an axial extension portion extending in an axial direction to define the second portion of the cavity,
wherein the stepped portion is configured to contact a second stepped portion of the inner gun tube when the inner gun tube fully engages the diffuser,
wherein a downstream side of the diffuser is configured to couple to a contact tip to pass a welding current into a consumable welding wire received by the diffuser from the inner gun tube, and
wherein a length of the axial extension portion in the axial direction is 0% longer to no more than 45% longer than a length of the stepped portion in the radially outward direction, to transfer impact loads from the diffuser to the inner gun tube.

2. The diffuser of claim 1, wherein the cavity is configured to accept the distal end portion of the inner gun tube by way of a threaded connection.

3. The diffuser of claim 1, further comprising a shoulder portion extending radially at a downstream end of the cavity, wherein a gap forms between the distal end portion of the inner gun tube and the shoulder portion when the inner gun tube fully engages the diffuser.

4. The diffuser of claim 1, further comprising a break-away recess on an outer surface of the diffuser configured to provide a weak point in the diffuser where, when a force or load being above a threshold is applied to the diffuser, the diffuser fails at the break-away recess.

5. The diffuser of claim 4, wherein the break-away recess is a v-shaped groove.

6. The diffuser of claim 1, wherein the upstream side of the diffuser is configured to receive a shielding gas from the inner gun tube during a welding operation.

7. The diffuser of claim 6, wherein the downstream side of the diffuser is configured to direct and distribute the shielding gas received by the upstream side of the diffuser during the welding operation.

8. The diffuser of claim 1, wherein the inner surface of the axial extension portion is configured to engage with an outer surface of the main body portion of the inner gun tube by way of a friction fit.

9. The diffuser of claim 1, wherein the stepped portion includes an inner corner portion configured as being chamfered or radiused.

10. The diffuser of claim 1, wherein the length of the axial extension portion in the axial direction is 20% to 45% longer than the length of the stepped portion in the radially outward direction.

11. A diffuser for a welding torch assembly, comprising:
a downstream side configured to couple to a contact tip to pass a welding current into a consumable welding wire received by the diffuser from an inner gun tube; and
an upstream side including:
a cavity configured to couple to a distal end portion of the inner gun tube, and
a locking portion including an inner surface configured to engage with an outer surface of a main body portion of the inner gun tube,
wherein the locking portion has a locking shoulder portion on the upstream side of the diffuser that is configured to contact a stepped portion of the inner gun tube when the inner gun tube fully engages the diffuser, where the stepped portion of the inner gun tube extends radially from an outer surface of a distal end portion of the inner gun tube to an outer surface of the main body portion of the inner gun tube, and
wherein an axial length of the locking portion from the locking shoulder portion to an upstream end of the locking portion is 0% longer to no more than 45% longer than a radial length of the locking shoulder portion, to transfer impact loads from the diffuser to the gun tube.

12. The diffuser of claim 11, wherein the cavity is configured to accept the distal end portion of the inner gun tube by way of a threaded connection.

13. The diffuser of claim 11, further comprising a shoulder portion extending radially at a downstream end of the cavity, wherein a gap forms between the distal end portion of the inner gun tube and the shoulder portion when the inner gun tube fully engages the diffuser.

14. The diffuser of claim 11, further comprising a break-away recess on an outer surface of the diffuser, wherein the break-away recess is disposed downstream of the cavity of the diffuser.

15. The diffuser of claim 14, wherein the break-away recess is a v-shaped groove.

16. The diffuser of claim 11, wherein the upstream side of the diffuser is configured to receive a shielding gas from the inner gun tube during a welding operation.

17. The diffuser of claim 16, wherein the downstream side of the diffuser is configured to direct and distribute the shielding gas received by the upstream side of the diffuser during the welding operation.

18. The diffuser of claim 17, further comprising an outer surface configured to engage with a nozzle for directing the shielding gas from the diffuser toward a workpiece during the welding operation.

19. The diffuser of claim 18, wherein the outer surface of the diffuser is configured to engage with the nozzle by way of a threaded connection.

20. The diffuser of claim 11, wherein the axial length of the locking portion from the locking shoulder portion to the upstream end of the locking portion is 20% to 45% longer than the radial length of the locking shoulder portion.

* * * * *